United States Patent [19]
Meyer

[11] Patent Number: 6,013,964
[45] Date of Patent: Jan. 11, 2000

[54] SERIES MOTOR

[76] Inventor: Christoph Meyer, Sauerampferweg 18, 70599 Stuttgart, Germany

[21] Appl. No.: 09/128,402

[22] Filed: Aug. 3, 1998

[30]     Foreign Application Priority Data

Aug. 13, 1997 [DE] Germany .......................... 197 34 958

[51] Int. Cl.$^7$ ...................................................... H02K 1/00
[52] U.S. Cl. ........................... 310/184; 310/198; 310/269
[58] Field of Search ..................................... 310/184, 269, 310/198, 216

[56]              References Cited

U.S. PATENT DOCUMENTS

| 2,726,344 | 12/1955 | Neuenschwander | 310/172 |
|---|---|---|---|
| 3,576,456 | 4/1971 | Wolf | 310/186 |
| 3,725,707 | 4/1973 | Leimbach et al. | 310/71 |
| 4,041,338 | 8/1977 | Madsen et al. | 310/186 |
| 4,058,746 | 11/1977 | Mole et al. | 310/10 |
| 4,263,524 | 4/1981 | Diederichs | 310/112 |
| 4,305,027 | 12/1981 | Wilson | 318/439 |
| 4,439,703 | 3/1984 | Kohzai et al. | 310/186 |
| 5,677,586 | 10/1997 | Horst | 310/103 |

FOREIGN PATENT DOCUMENTS

| 0471038B1 | 2/1992 | European Pat. Off. . |
|---|---|---|
| 4307357A1 | 9/1994 | Germany . |
| 19700074A1 | 9/1997 | Germany . |
| 19651298A1 | 6/1998 | Germany . |

*Primary Examiner*—Clayton LaBalle
*Assistant Examiner*—Joseph Waks

[57]              ABSTRACT

A series motor with a commutator and commutating winding, in particular for a braked power tool with a universal motor, is disclosed, having a stator which has a stator plate bundle that forms a closed yoke, having at least two field windings and at least one commutating winding, which is laid into grooves of the stator plate bundle. The stator plate bundle has, in the region of the axial ends of the at least one commutating winding, lateral grooves running transversely to the axial direction of the stator for receiving the ends of the at least one commutating winding, so that the commutating winding can be received flush in the stator plate bundle and thus the axial size of the stator can be shortened while output remains the same.

7 Claims, 3 Drawing Sheets

SERIES MOTOR

BACKGROUND OF THE INVENTION

The present invention relates to a series motor with a commutator and commutating winding, in particular for a braked power tool with a universal motor, having a stator which has a stator plate bundle that forms a closed yoke, having at least two field windings and at least one commutating winding, which are laid into grooves of the stator plate bundle.

A motor of this kind is known, for example, from EP 0 471 038 B1.

The known motor can be switched between motor mode and braking mode, commutating windings being provided which allow, in braking mode, rapid short-circuit braking due to autonomous self-excitation.

A series motor of similar design is known from DE 43 07 357 A1.

A feature common to the known motors is the fact that the commutating windings are laid into grooves in the stator plate bundle, the winding bundles projecting with each of their axial ends beyond the stator plate bundle. Since the field windings are usually guided around the commutating windings, the result is an increase in physical size, since the larger field winding bundles rest on the ends of the commutating windings which project out from the stator plate bundles.

Particularly in the case of universal motors which are used in power tools, however, the physical size of a motor for a specific defined output is a critical parameter. Even a lengthening of the motor by only a few millimeters is viewed as extraordinarily disadvantageous.

SUMMARY OF THE INVENTION

It is thus the object of the invention to provide a series motor having a smaller physical size, in particular a stator that is shortened in the axial direction, but still having the same output as a conventional motor.

It is a further object of the invention to provide a series motor having an increased output without substantially increasing its size when compared with conventional series motors.

According to the invention, these and other objectives can be achieved, in the case of a series motor of the kind cited initially, in that the stator plate bundle has, in the region of the axial ends of the at least one commutating winding, lateral grooves extending transversely to the axial direction of the stator for receiving the ends of each commutating winding.

The objectives of the invention are entirely achieved in this fashion, since the axial ends of each commutating winding can now be guided through the lateral grooves, extending in the transverse direction, to the adjacent axial groove, so that any projection of the axial ends of the commutating windings beyond the end surfaces of the stator plate bundle can be prevented or reduced.

This results in a shortening of the physical size of the motor in the axial direction, which means, for example in the case of a universal motor of ordinary size, a shortening by approximately 5 mm at each end, i.e. leads to a total shortening by approximately 1 cm, which is to be regarded as a considerable advantage.

It has been found that these lateral grooves do not lead to any diminution in output, or to any degradation of braking characteristics in braking mode.

According to an additional improvement of the invention, the commutating winding is in this context guided around a pole horn which is shortened at its two axial ends. The result which can thereby be achieved in particularly simple fashion is that the axial ends of the commutating winding do not project beyond the end surfaces of the stator plate bundle, or project only so insignificantly that the axial length is not disadvantageously affected, since the ends of the field windings have a certain radius in any case.

According to a further embodiment of the invention, the stator plate bundle is terminated at its two end surfaces by plates whose cross section corresponds to the cross section of the remaining plates without lateral grooves.

In this fashion, any change to the stator plates at the axial ends can be completely avoided, since the limbs of a particular commutating winding received in axial grooves are joined to one another in the transverse direction via the lateral grooves, which are each again covered on the outside, toward the axial end, by a cross section which corresponds to the cross section of the relevant pole horn in the center of the stator plate bundle that is not interrupted by lateral grooves.

According to a further embodiment of the invention, the commutating winding is laid with one winding limb into an axial groove between the two pole horns of one pole, and with its other winding limb is laid into an axial groove formed between one pole horn and the yoke, the field winding of that pole extending with one winding limb beyond the limb of the commutating winding.

Advantageously, with this embodiment a commutating pole, which preferably is offset slightly from the pole center in the running direction, is integrated into each pole in order to achieve optimum efficiency.

With this embodiment, good braking action can be guaranteed with a diminished physical size and identical output.

It is understood that the features mentioned above and those yet to be explained below can be used not only in the respective combinations indicated, but also in other combinations or in isolation, without leaving the context of the present invention.

SHORT DESCRIPTION OF THE DRAWINGS

Further features and advantages of the invention are evident from the description below of preferred exemplifying embodiments, with reference to the drawings in which:

FIG. 2 shows a perspective view of one half of a stator plate bundle, split in the longitudinal direction, having a commutating winding and a field winding laid in;

DETAILED DESCRIPTION OF THE PREFERRED EMBODIMENTS

Figure 1:
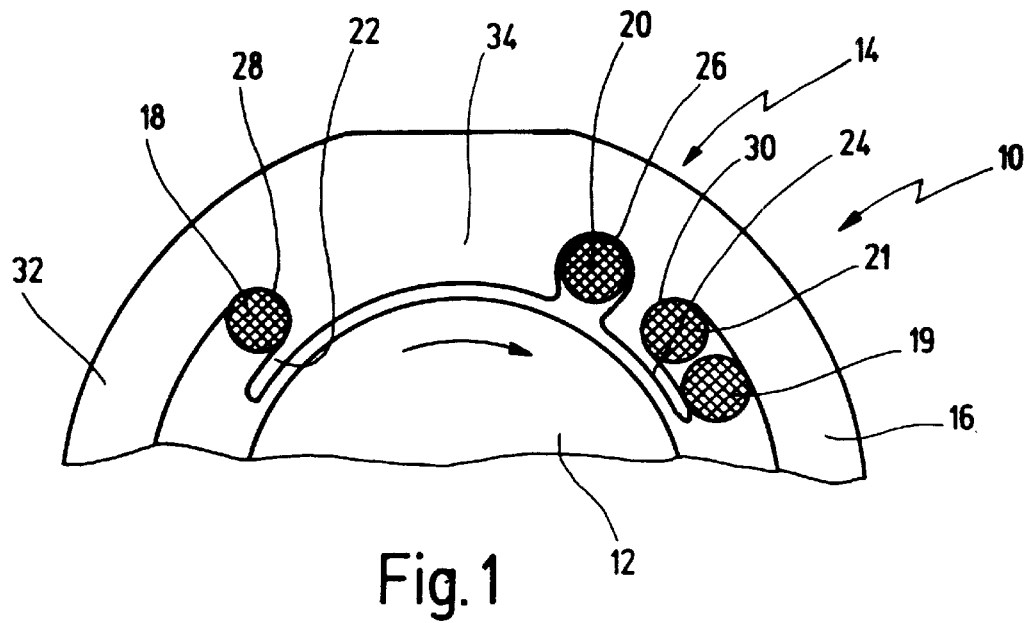
FIG. 1 shows a partial cross section through a motor according to the invention.

In FIG. 1, a series motor according to the invention is labeled as a whole with the number 10. Series motor 10 comprises a stator 14 having a stator plate bundle 16 which preferably is embodied in longitudinally split fashion (not shown) and constitutes a magnetically closed yoke 32.

Rotor 12 is indicated only in purely schematic fashion in FIG. 1.

Series motor 10 comprises two symmetrically configured poles located opposite one another, of which only one pole 34 is shown in FIG. 1.

Pole 34 is terminated at both sides by pole horns 22, 24, axial grooves 28 and 30, in which windings are received, being constituted between pole horns 22, 24 and the outer yoke 32.

A further axial groove 26 for receiving a winding limb 20 of a commutating winding is provided, offset in the rotation direction of the motor, between the right-hand (in FIG. 1) pole horn 24 and left-hand pole horn 22. Commutating winding 20, 21 thus extends with its one limb 20 into groove 26, and with its other limb 21 directly into axial groove 30 constituted between pole horn 24 and yoke 32.

The field winding of pole 34 extends with its one winding limb 18 in axial groove 28 constituted between pole horn 22 and yoke 32, and with its other winding limb 19 in axial groove 30 constituted between the other pole horn 24 and yoke 32, and rests with that winding limb against the relevant winding limb 21 of commutator winding 20, 21.

According to the invention, stator plate bundle 16 has a specific configuration which allows it to receive commutating winding 20, 21 in a manner substantially countersunk inside stator plate bundle 16, so that the axial ends of commutating winding 20, 21 project not at all or only insignificantly beyond the axial end surfaces of stator plate bundle 16.

Figure 2:
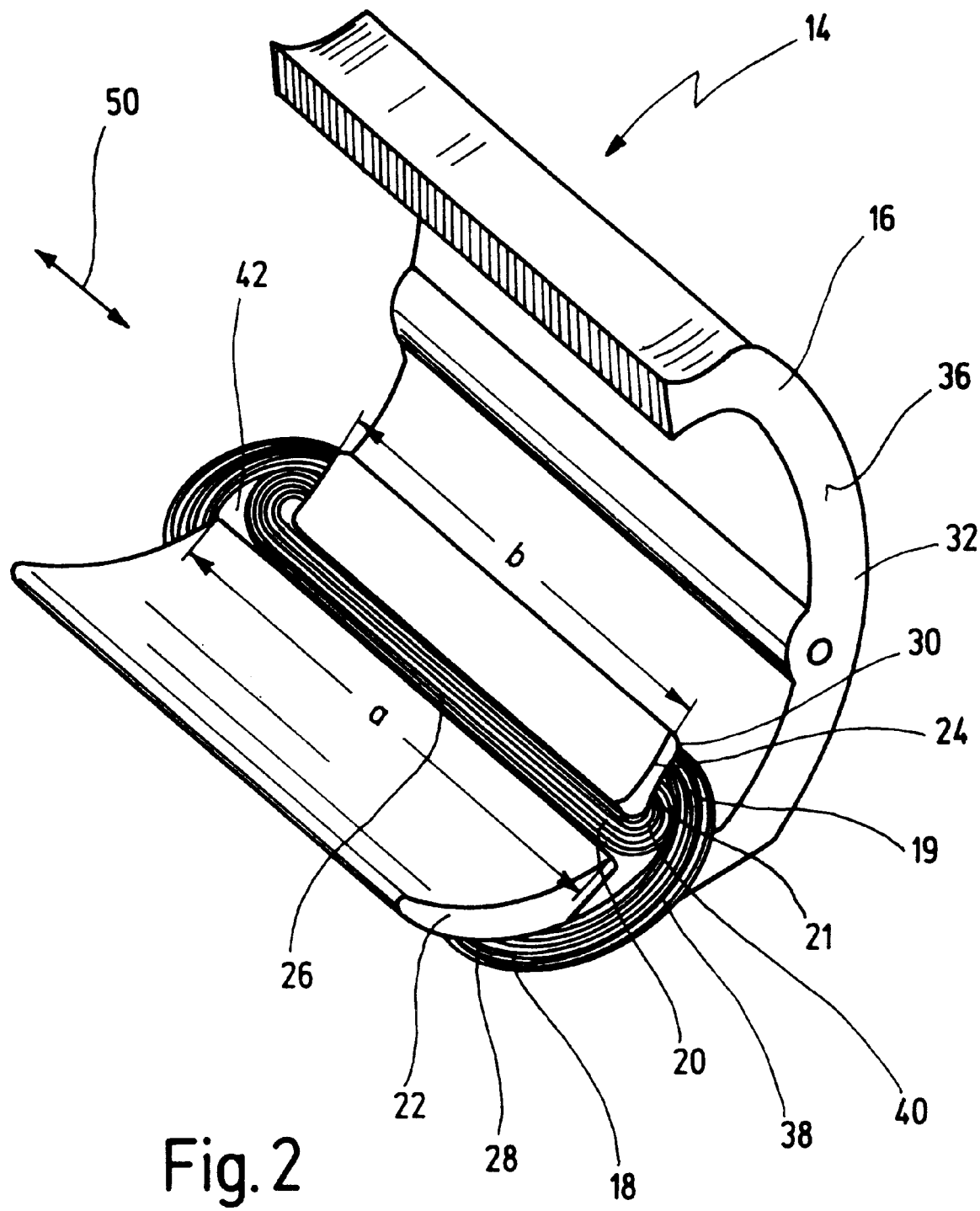
Figure 3:
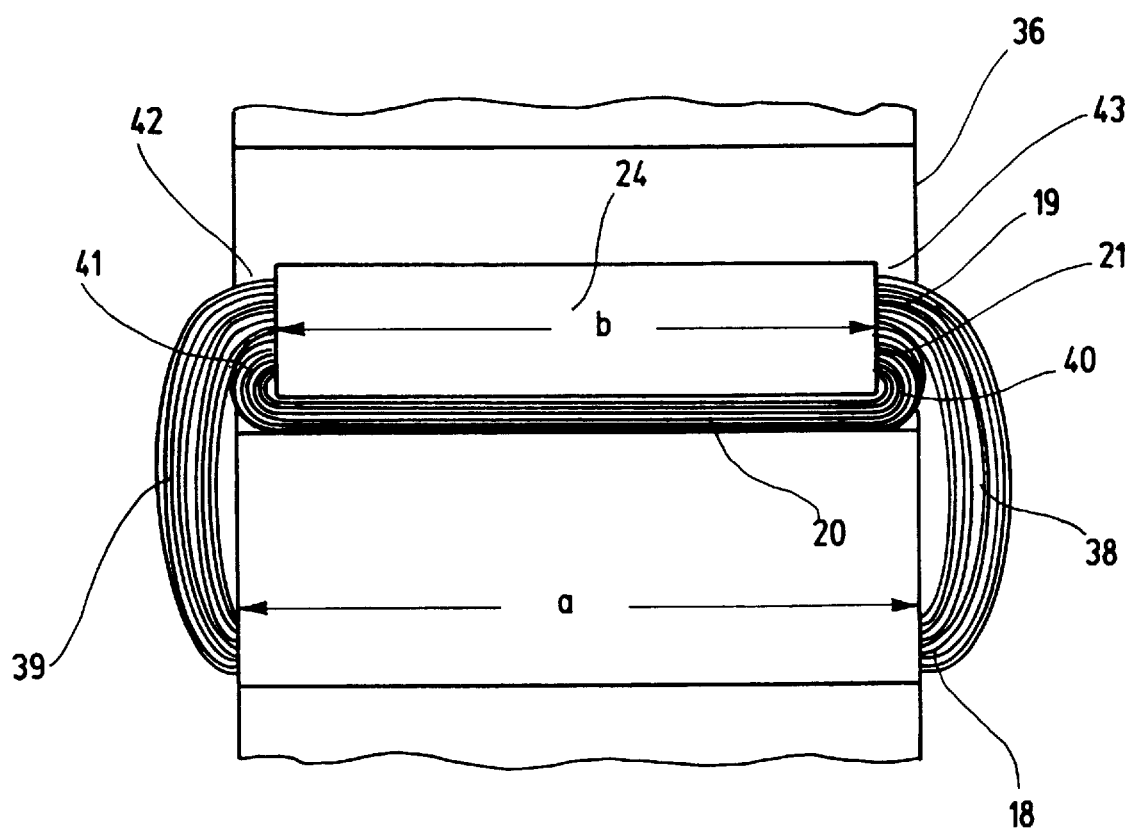
FIG. 3 shows a plan view of the stator shown in FIG. 2 in the region of the laid-in commutating winding, but without the field winding.

This structure is more clearly visible in FIG. 2 and FIG. 3.

FIG. 2 shows in perspective one half of stator 14 shown in FIG. 1, split in the axial direction; the dimensions are not absolutely to scale, so that any differences between FIG. 1 and FIG. 2 are not intentional, but simply a consequence of the different depictions. Projecting inward from yoke 32 of stator plate bundle 16, as explained above with reference to FIG. 1, are the one pole horn 22 around which one limb 18 of the field winding is guided, and the other pole horn 24 around which the one limb 21 of the commutating winding and the second limb 19 of the commutating winding is guided. The surfaces of pole horns 22, 24 facing rotor 12 are matched, in known fashion, to the circular shape of rotor 12 so as to minimize air gap losses.

Axial groove 26 extending in the axial direction 50 of stator 14, into which the one limb 20 of commutating winding 20, 21 is laid, is evident from FIG. 2.

According to the invention, pole horn 24 around which the commutating winding and the field winding are guided, with a respective limb 21 and 19, respectively, is shortened in the axial direction 50, as is visible particularly in the depiction of FIG. 3, which shows a plan view from above of one half of the stator shown in FIG. 2.

While the axial length of stator plate bundle 16 has a length a, pole horn 24, around which the one limb 21 of the commutating winding and the one limb 19 of the field winding are guided, has a shorter axial length b. Length b is dimensioned such that commutating winding 20, 21 can be guided with its respective axial ends 40, 41 around the end of pole horn 24 without causing the axial ends 40, 41 to project beyond end surfaces 36 of stator plate bundle 16. Commutating winding 20, 21 is thus received, with its axial ends, approximately flush within stator plate bundle 16, or projects slightly outward, since the field winding extends in any case in a radius and is not completely in contact against the end surfaces.

As is evident from FIG. 2 and FIG. 3, field winding 18, 19 is now guided, with its respective axial ends 38, 39, around the axial ends 40, 41 of commutating winding 20, 21 and, because commutating winding 20, 21 is received in largely flush fashion inside stator plate bundle 16, can be kept as short as possible along with the respective ends 38 of its winding bundle.

As compared with conventional series motors in which the axial ends of the commutating windings project outward beyond the respective end surfaces of the stator plate bundle, according to the invention, in the case of an ordinary embodiment as a universal motor, a shortening of the axial length at each end by approximately 5 mm, i.e. by a total of approximately 10 mm, is achieved.

It has been ascertained in tests that absolutely no performance impairment is associated therewith, and also that braking action remains unchanged.

The teaching of the invention can advantageously be applied to series motors of various designs, for example to the motor as described by EP 0 471 038 B1 cited initially, or to the motor described by German Patent Application 196 51 298 A1. The former motor is a commutator motor in series having commutating poles and having switch devices to switch between motor mode and braking mode, the motor being short-circuited in braking mode by means of the switch device and the field winding being reversed; and having means for limiting the braking current through the field winding, with which, when operated with alternating current, smooth and rapid short-circuit braking can be effected by autonomous self-excitation. For this, in the motor mode the armature is connected between the field winding and the commutating winding, while in the braking mode, in order to limit the braking current through the field winding, a current path containing the means for limiting the braking current is connected between the armature and the commutating winding, so that only a predetermined portion of the braking current flows through the field winding. Zener diodes connected antiparallel to one another are provided in order to limit the braking current.

In the case of German Patent Application 196 51 298 A1, the series motor has at least one field winding having an armature winding connected in series, as well as at least one commutating winding to brake the motor in braking mode, as well as a switch device for switching the motor between braking mode and motor mode. The at least one brake winding is arranged in a separate current path which is activated only in braking mode. The separate current path can either be connected by the switching device, in braking mode, in parallel with the armature winding, or can be coupled by the switch device, in braking mode, in shunt fashion to the supply voltage.

Regardless of the circuitry of the series motor in question, the teaching of the invention can thus be used advantageously to achieve a shortened length for the stator.

It is understood that the invention can also be used in other embodiments, e.g. for a series motor as described by DE 43 07 357 A1.

Figure 4:
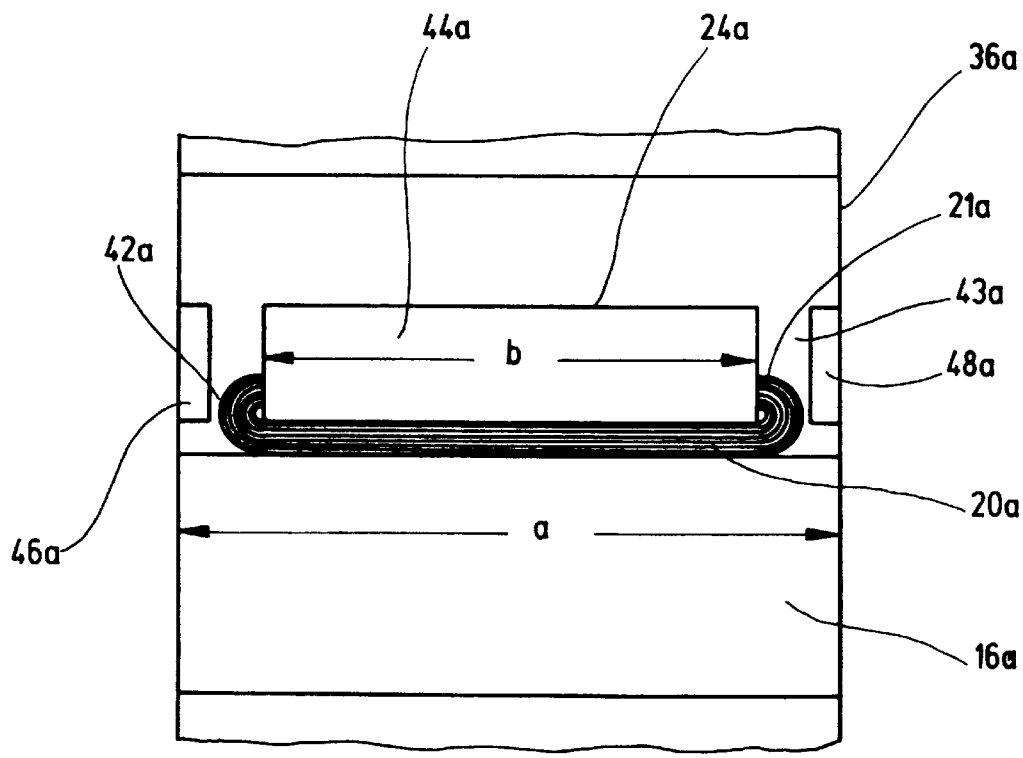
FIG. 4 shows a plan view of the stator shown in FIG. 2 in the region of the laid-in commutating winding, but in a slightly different version as compared with FIG. 2.

A variant of the embodiment shown in FIG. 2 and FIG. 3 is shown in FIG. 4.

FIG. 4 shows a plan view from above of one half of the stator shown in FIG. 2, pole horn 24a being somewhat altered as compared with pole horn 24 shown in FIG. 3. Pole horn 24a is once again shortened at both of its ends, as indicated by length b. In contrast to the embodiment shown in FIG. 3, however, stator plate bundle 16a is terminated at its two axial ends by plates whose cross section corresponds entirely to the plate cross section in the center region where no lateral grooves 42a, 43a are provided, through which the ends of commutating winding 20a, 21a run transversely.

Pole horn 24a thus has a middle section 44a of length b which is separated at both axial ends, by lateral grooves 42a, 43a extending straight in lateral direction, from respective end regions 46a, 48a whose cross section corresponds to the cross section of pole horn 24a in the middle section 44a.

Pole horn 24a is thus interrupted at its two ends only by the lateral grooves.

Commutating winding 20a, 21a thus lies, as in the case of the embodiment shown in FIG. 2, with its limbs 20a, 21a in the grooves extending in the axial direction, and extends with its axial ends through lateral grooves 42a, 43a.

While the invention has been demonstrated with lateral grooves extending straight, it should be evident that also other configurations, such as curved grooves, can be utilized as lateral grooves.

I claim:

1. A series motor comprising:
   a rotor extending in an axial direction and arranged rotatably within a stator;
   a stator plate bundle forming a closed yoke and having an axial length, said stator plate bundle comprising two axial ends each of which having an end surface;
   axial grooves provided on said stator plate bundle for receiving at least one commutating winding, each said commutating winding comprising
   an axial end;
   at least two field windings; and
   lateral grooves extending transversely to the axial direction in the vicinity of said axial ends of said stator plate bundle, said axial and lateral grooves being arranged to receive the commutating windings such that the axial ends of the commutating windings are received at least partially within the lateral grooves and protrude beyond the end surfaces of the stator plate bundle at most by half of a thickness of the commutating windings.

2. The series motor as defined in claim 1, wherein the lateral grooves are configured such that the axial ends of the commutating windings do not protrude beyond the end surfaces of the stator plate bundle.

3. The series motor as defined in claim 1, wherein the stator plate bundle comprises at least two poles, each of which comprising two pole horns, around one of which one of the commutating windings is guided, said pole horn having an axial length which is shorter than the axial length of said stator plate bundle.

4. The series motor as defined in claim 1, wherein the stator plate bundle comprises a middle section extending between said lateral grooves and having a certain cross section; and wherein the stator plate bundle comprises end plates at its end surfaces each having a cross section which corresponds to the cross section of the middle section.

5. The series motor as defined in claim 1, wherein the stator plate bundle comprises at least two poles, each of which comprising two pole horns, wherein at least one of the commutating windings comprises two winding limbs, one of which is laid into an axial groove extending between the two pole horns of one of the poles, another one of the poles is laid into an axial groove extending between the one pole horn and the yoke, and wherein the field winding of that pole comprises two winding limbs, one of which extends beyond the winding limb of the commutating winding.

6. A series motor comprising:
   a rotor extending in an axial direction and arranged rotatably within a stator;
   a stator plate bundle forming a closed yoke and having an axial length, said stator plate bundle comprising two axial ends each of which having an end surface;
   axial grooves provided on said stator plate bundle for receiving at least one commutating winding, each said commutating winding comprising
   an axial end;
   at least two field windings;
   lateral grooves extending transversely to the axial direction in the vicinity of said axial ends of said stator plate bundle, said axial and lateral grooves being arranged to receive the commutating windings such that the axial ends of the commutating windings are received at least partially within the lateral grooves and protrude beyond the end surfaces of the stator plate bundle at most by half of a thickness of the commutating windings;
   wherein the stator plate bundle comprises at least two poles, each of which comprising two pole horns, around one of which one commutating winding is guided, said pole horn having an axial length which is shorter than the axial length of said stator plate bundle; wherein the stator plate bundle comprises a middle section extending between said lateral grooves and having a certain cross section; and wherein the stator plate bundle comprises end plates at its end surfaces each having a cross section which corresponds to the cross section of the middle section.

7. The series motor as defined in claim 6, wherein the stator plate bundle comprises at least two poles, each of which comprising two pole horns, wherein at least one commutating winding comprises two winding limbs, one of which is laid into an axial groove extending between the two pole horns of one pole, the other one of which is laid into an axial groove extending between one pole horn and the yoke, and wherein the field winding of that pole comprises two winding limbs, one of which extends beyond the winding limb of the commutating winding.

* * * * *

UNITED STATES PATENT AND TRADEMARK OFFICE
CERTIFICATE OF CORRECTION

PATENT NO. : 6,013,964
DATED : January 11, 2000
INVENTOR(S) : MEYER

It is certified that error appears in the above-identified patent and that said Letters Patent are hereby corrected as shown below:

ASSIGNEE: C. & E. FEIN GMBH & CO., of Stuttgart, Germany

Signed and Sealed this

Twenty-seventh Day of June, 2000

*Attest:*

Q. TODD DICKINSON

*Attesting Officer*     *Director of Patents and Trademarks*